United States Patent
Barel

(10) Patent No.: US 12,019,812 B1
(45) Date of Patent: Jun. 25, 2024

(54) STYLUS USAGE STATE IDENTIFICATION FROM ACCELERATION PROFILE

(71) Applicant: Microsoft Technology Licensing, LLC, Redmond, WA (US)

(72) Inventor: Eliyahu Barel, Rosh-HaAyin (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/298,990

(22) Filed: Apr. 11, 2023

(51) Int. Cl.
  *G06F 3/0354* (2013.01)
  *G06F 3/01* (2006.01)
  *G06F 3/0346* (2013.01)
  *G06F 3/041* (2006.01)
  *G06F 3/044* (2006.01)

(52) U.S. Cl.
  CPC .......... *G06F 3/03545* (2013.01); *G06F 3/016* (2013.01); *G06F 3/0346* (2013.01); *G06F 3/04162* (2019.05); *G06F 3/0442* (2019.05)

(58) Field of Classification Search
  None
  See application file for complete search history.

(56) References Cited

U.S. PATENT DOCUMENTS

| | | | |
|---|---|---|---|
| 7,639,232 B2 * | 12/2009 | Grant | B06B 1/0215 345/161 |
| 2014/0089792 A1 | 3/2014 | Ramsay et al. | |
| 2016/0110012 A1 * | 4/2016 | Yim | G06F 1/163 345/173 |
| 2018/0235017 A1 * | 8/2018 | Sakamoto | G06F 3/0383 |
| 2019/0346304 A1 * | 11/2019 | Shimosugi | G06F 3/03545 |
| 2020/0159330 A1 * | 5/2020 | Cruz-Hernandez | B25J 9/1689 |
| 2022/0334658 A1 * | 10/2022 | Dekel | G06F 3/03545 |
| 2023/0333672 A1 * | 10/2023 | Goh | G06F 3/03545 |

FOREIGN PATENT DOCUMENTS

WO     2022221809 A1     10/2022

* cited by examiner

*Primary Examiner* — Dorothy Harris
(74) *Attorney, Agent, or Firm* — Alleman Hall & Tuttle LLP

(57) ABSTRACT

An active stylus includes a haptic feedback subsystem, an accelerometer, and a controller that controls the haptic feedback subsystem to generate a haptic pulse having predefined haptic characteristics. The controller receives a detected acceleration profile from the accelerometer. The detected acceleration profile is caused at least partially by propagation of the haptic pulse through a stylus body of the active stylus, and caused at least partially by attenuation of the haptic pulse by an external object contacting the stylus body. A current usage state of the active stylus is identified based at least in part on a comparison between the detected acceleration profile and a acceleration context model.

20 Claims, 15 Drawing Sheets

200

CONTROL A HAPTIC FEEDBACK MOTOR TO GENERATE A HAPTIC PULSE HAVING PREDEFINED HAPTIC CHARACTERISTICS   202

RECEIVE, FROM AN ACCELEROMETER, A DETECTED ACCELERATION PROFILE CAUSED AT LEAST PARTIALLY BY PROPAGATION OF THE HAPTIC PULSE THROUGH A STYLUS BODY   204

IDENTIFY A CURRENT USAGE STATE OF THE ACTIVE STYLUS   206

STYLUS USAGE STATE IDENTIFICATION FROM ACCELERATION PROFILE

BACKGROUND

Active styluses are often configured to switch between two or more different power states depending on whether the stylus is in use. For example, while an active stylus is being used to provide touch input to a computing device, the stylus often operates in an active power state—e.g., in which the active stylus transmits data to the host computing device. By contrast, while the stylus is not in use, it may switch to an inactive power state—e.g., in which data transmission, haptic feedback, and/or other functions are either reduced or discontinued in order to reduce stylus power consumption, and/or change a configuration of a computing device that the stylus is used with—e.g., from a stylus display configuration to a mouse-and-keyboard display configuration.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

The present disclosure is generally directed to identifying the current usage state of an active stylus based at least in part on an acceleration profile detected at an accelerometer. The stylus includes a haptic feedback subsystem that is controlled to generate a haptic pulse having predefined haptic characteristics—e.g., pulse frequency, amplitude, and/or length. The acceleration profile detected at the accelerometer is caused at least partially by the haptic pulse generated by the haptic feedback subsystem, and caused at least partially by attenuation of the haptic pulse due to contact between the stylus body and an external object, such as a human hand or table surface. By comparing the detected acceleration profile to an acceleration context model, the current usage state of the active stylus is identified.

DETAILED DESCRIPTION

Figure 1:
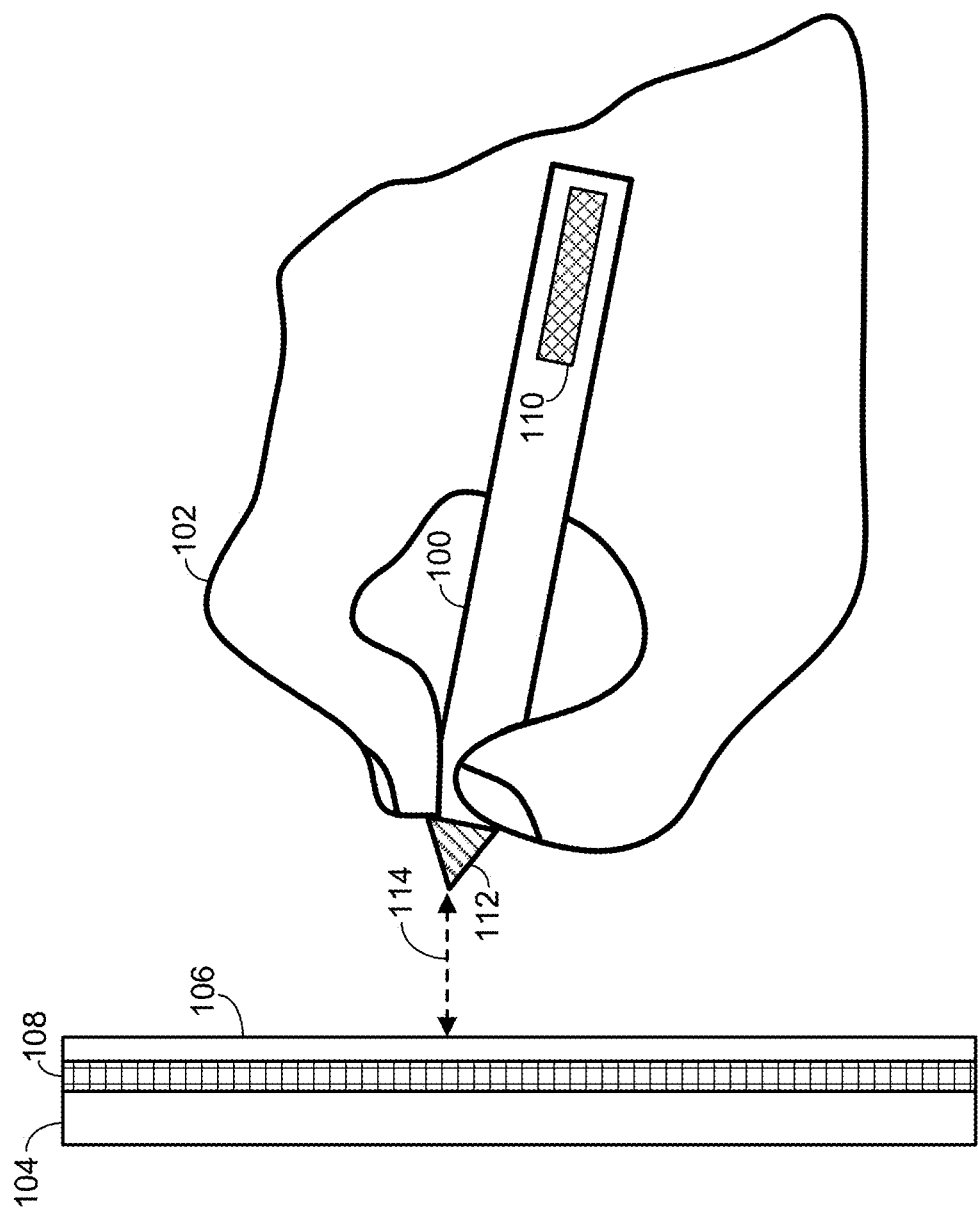
FIG. 1 schematically illustrates use of an active stylus with a host computing device.

As discussed above, an active stylus often operates in two or more different power modes depending on its current context. In one example, a stylus operates in an active power mode while it is being used to interact with a host computing device. When the stylus is no longer in active use, it is switched to an inactive mode in which one or more power-consuming functions of the active stylus are disabled. For example, once switched to the inactive mode, the stylus may reduce the frequency with which it transmits data (e.g., such transmission may be discontinued), and/or disable one or more internal components (e.g., haptic feedback systems, communications systems, logic components), in order to preserve battery life.

The present disclosure generally describes the stylus's current power mode as being one of two binary states corresponding to a user's intent to use the stylus—e.g., the stylus is either in an "active" power mode when a user intends to use the stylus to control a host computing device, or the stylus is in an "inactive" power mode when the user does not intend to use the stylus. The user's intent to use the stylus is inferred from the stylus's current "usage state," the identification of which will be described in more detail below.

However, it will be understood that a stylus may operate in a wide variety of different power modes, differentiated by a wide variety of different power-consumption behaviors. For instance, the "active power mode" described herein may differ depending on whether the active stylus is being used to provide input to a host computing device, the stylus is currently pairing with a host computing device, the stylus is currently scanning for potential devices to pair with, etc. Similarly, a stylus in an "inactive power mode" may nonetheless perform at least some power-consuming operations continuously, periodically, and/or in response to detected triggers. For example, the stylus may enter an active state based on detected accelerometer data, the stylus may activate a haptic feedback subsystem/accelerometer to infer whether its usage state has changed, it may connect to a network to download and install a software/firmware update, it may transmit and/or receive data to detect presence of a host computing device or other electronic device, etc.

It can be difficult to determine the current usage state of the stylus, and thereby determine the power mode that the stylus should operate in. In particular, it can be challenging to detect when the usage state of the stylus actually changes—e.g., determining when a detected accelerometer signal corresponds to a user picking up a stylus because they intend to use it, as opposed to the user carrying the stylus in a bag. Furthermore, suboptimal switching between power modes can contribute to a poor user experience, and/or unnecessarily consume battery life of the active stylus. For instance, when a user intends to use their stylus with a host computing device, it is generally desirable to reduce any perceived latency between the user operating the stylus, and such operation affecting the behavior of the computing device—e.g., the stylus should switch relatively quickly from the inactive power mode to the active power mode. However, overly sensitive switching from the inactive power mode to the active power mode can negatively affect the stylus's battery life—e.g., the stylus may switch to the active mode while it is being carried in a bag or even resting on a surface, thereby wasting power.

As such, the present disclosure is directed to techniques for identifying the current usage state of an active stylus. Specifically, the current usage state is identified based at least in part on an acceleration profile detected by an accelerometer of the active stylus. The stylus includes a haptic feedback system that is configured to generate a haptic pulse having predefined haptic characteristics—e.g., a predefined pulse length, frequency, and/or amplitude. The acceleration profile detected by the accelerometer is caused at least partially by the haptic pulse, and caused at least partially by contact between the stylus body and an external object, such as a human hand, table surface, or container (e.g., bag, pocket, carrying case). Various factors such as the material properties of the external object, the total surface area of the stylus body that the external object is contacting, the pressure with which the external object is contacting the stylus body, etc., each contribute to attenuation of the haptic pulse, thereby affecting the characteristics of the detected acceleration profile. In this manner, by comparing the detected acceleration profile to an acceleration context model, the current usage state of the active stylus is identified. From there, various functions of the stylus can be activated or deactivated depending on the current usage state.

In this manner, the techniques described herein provide the technical benefit of reducing consumption of computer resources—e.g., conserving battery life of the active stylus—by reducing instances of the active stylus unnecessarily entering an active power mode while it is not intended for use. Furthermore, the techniques described herein provide the technical benefit of reducing the burden of user input to the computing device, by increasing the speed and accuracy with which the active stylus enters the active power mode when the user does intend to use the stylus. For instance, in some examples, the techniques described herein reduce the perceived latency between a user providing an input using the active stylus, and a host computing device responding to the input, in cases when the stylus was previously inactive. Additionally, pairing between the stylus and computing device may change the behavior of the computing device—e.g., causing it to enter a "stylus" use mode in which the user interface changes, and/or to launch one or more specific software applications—also reducing the burden of user input to the computing device and improving human-computer interaction.

FIG. 1 schematically illustrates use of an active stylus with a host computing device. Specifically, FIG. 1 schematically shows an example active stylus 100 being held by a human hand 102. The stylus is being used to interact with a host computing device 104. In this example, the host computing device takes the form of a touch-sensitive display device, including a touch-sensitive display 106, which detects proximity of the active stylus via a plurality of display electrodes 108. The stylus includes a controller 110 which, as will be described in more detail below, controls other aspects of the active stylus to enable identification of the current usage state of the active stylus.

It will be understood that the specific devices shown in FIG. 1, including stylus 100 and host computing device 104, are highly-simplified and presented as non-limiting examples. In general, an "active stylus" takes the form of any suitable input object that is used to interact with a separate electronic device, such as a host computer. In some examples, an "active stylus" has a size and shape similar to an analog pencil or pen, although this is non-limiting. As will be described in more detail below, an "active stylus" includes at least a controller, a haptic feedback subsystem, and an accelerometer, and may include any variety of additional components and features—e.g., communications interfaces, batteries, and physical buttons/input mechanisms. The stylus "controller" takes the form of any suitable computer logic component—e.g., a processor or application-specific integrated circuit (ASIC). In some examples, a stylus controller is implemented as logic subsystem 1002 described below with respect to FIG. 10.

An active stylus is typically used to control or otherwise interact with a separate electronic device. In some examples, the separate electronic device is a computing device, such as a laptop, tablet, or smartphone, in which case the computing device is referred to as a "host computing device." The specific host computing device 104 shown in FIG. 1 is non-limiting, and it will be understood that a "host computing device" has any suitable hardware configuration, capabilities, and form factor. Active styluses are often used with computing devices having built-in touch-sensitive displays, although this is not limiting—rather, in some examples, a "host computing device" as described herein may lack touch-sensing functionality, and/or may lack a built-in display. In some examples, a "host computing device" is implemented as computing system 1000 described below with respect to FIG. 10.

In the example of FIG. 1, active stylus 100 is engaged in active data transmission to the host computing device. Specifically, active stylus 100 includes a stylus electrode 112 in the vicinity of the stylus tip. Controller 110 of the stylus causes the stylus electrode to be driven with an encoded electrostatic drive signal that influences electrical conditions in the vicinity of the stylus tip. This change in electrical conditions is detectable by the display electrodes 108 of host computing device 104 (e.g., as a change in local capacitance). By decoding the detected signal, the host computing device receives the data transmitted by the active stylus, as indicated by arrow 114. This is referred to as "electrostatic data transmission."

It will be understood that, in some examples, the host computing device additionally or alternatively transmits data to the active stylus in a similar manner—e.g., by driving the display electrodes with an encoded drive signal that is detectable at the stylus electrode. Furthermore, it will be understood that the active stylus and host computing device may exchange data in any suitable way in addition to, or instead of, electrostatic data transmission. As another non-limiting example, the active stylus and host computing device may exchange data via a suitable RF (radio frequency) communication modality, such as Bluetooth.

However, such active data transmission, and/or other functionality of the active stylus (such as haptic feedback) consumes electrical power and gradually depletes the battery life of the stylus. As discussed above, it is therefore beneficial to conserve computer resources (e.g., battery charge) by changing the stylus's power mode based on the stylus's current usage state. As such, method 200 illustrates an example method 200 for active stylus usage state identification. Method 200 is primarily described as being performed by a controller of an active stylus. However, it will be understood that steps of method 200 may be performed by any suitable computing system of one or more computing devices, and that any device implementing steps of method 200 has any suitable form factor, capabilities, and hardware configuration. Steps of method 200 may be initiated, repeated, and/or terminated at any suitable time and in response to any suitable trigger. In some examples, method 200 is implemented by computing system 1000 described below with respect to FIG. 10.

Figure 3A:
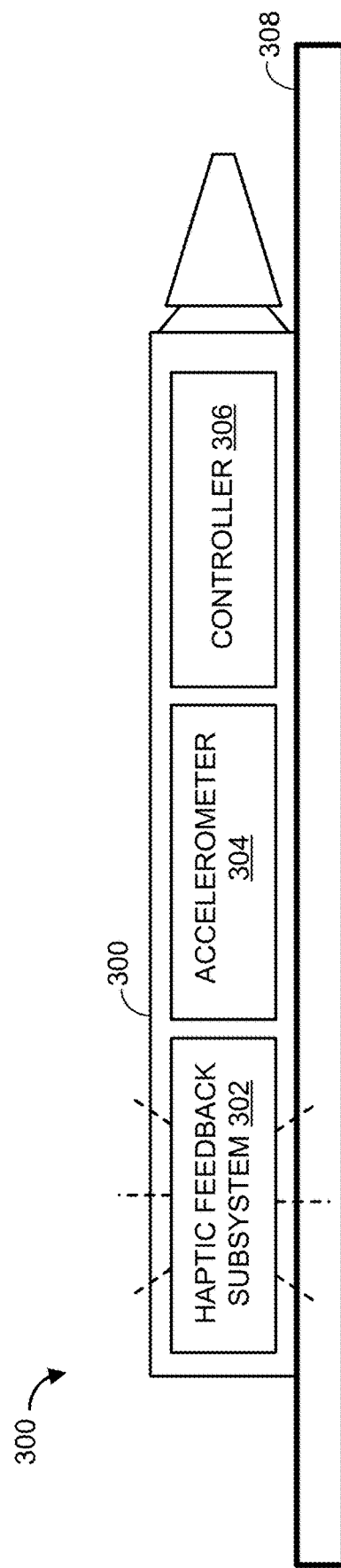
FIGS. 3A-3C schematically illustrate detection of an acceleration profile caused at least partially by a haptic pulse generated by a haptic feedback subsystem.

At 202, method 200 includes controlling a haptic feedback subsystem of an active stylus to generate a haptic pulse having predefined haptic characteristics. This is schematically illustrated with respect to FIG. 3A, showing a simplified example active stylus 300. As shown, active stylus 300 includes a haptic feedback subsystem, an accelerometer 304, and a controller 306.

In this example, the controller is actively controlling the haptic feedback subsystem to vibrate and thereby create a haptic pulse, as indicated by the dashed lines extending away from haptic feedback subsystem 302 in FIG. 3A. As will be described in more detail below, the haptic pulse generated by the haptic feedback system is detected at the accelerometer as part of a detected acceleration profile. However, the haptic pulse is at least partially attenuated due to contact between the stylus body and an external object. In the example of FIG. 3A, active stylus 300 is resting on an external object 308, taking the form of a surface—e.g., tabletop. The manner in which the haptic pulse is attenuated varies depending on the nature of the external object (e.g., its rigidity), the amount of pressure exerted by the external object on the stylus body, the amount of surface area of the stylus body that is contacting the external object, etc.

Haptic feedback subsystem 302 takes the form of any suitable device or mechanism for providing haptic feedback. In general, the haptic feedback device is controllable by the stylus controller to provide haptic feedback having controllable haptic characteristics, such as a vibration frequency, intensity, and/or duration. As non-limiting examples, haptic feedback subsystem 302 may take the form of an eccentric rotating mass (ERM) actuator or a linear resonant actuator (LRA).

The present disclosure primarily describes using the haptic feedback subsystem to generate a haptic pulse for the purposes of identifying the current usage state of the active stylus—e.g., based on the detected contribution of the haptic pulse to an acceleration profile detected at the accelerometer. However, it will be understood that in some examples, the haptic feedback subsystem is controlled to provide haptic feedback in any of a wide variety of scenarios in addition to identifying the current usage state of the active stylus. As one non-limiting example, the haptic feedback subsystem is used to provide haptic feedback while the stylus is used to provide touch input to a touch-sensitive display of a host computing device—e.g., thereby mimicking the sensation of writing on paper using a pen or pencil.

Figure 3B:
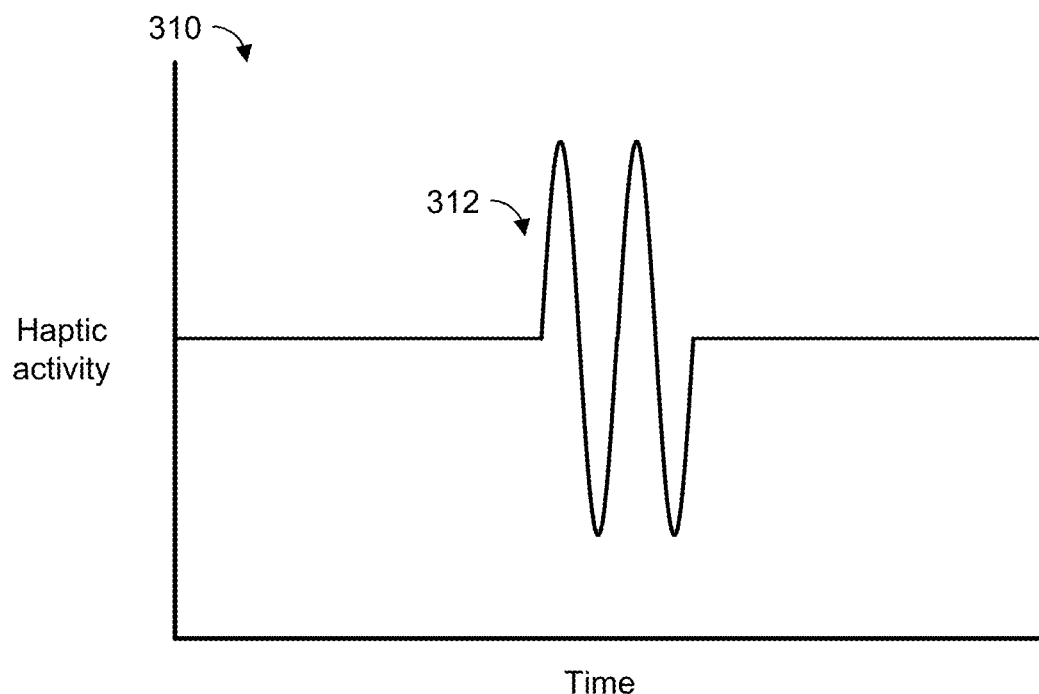

FIG. 3B provides an example of a haptic pulse generated by the haptic feedback subsystem. Specifically, 3B shows a non-limiting plot 310 of haptic activity (e.g., vibration intensity) over time, including a discrete pulse 312. It will be understood that haptic pulse 312 is highly simplified and provided only as a non-limiting example for the sake of explanation. In general, a "haptic pulse" as described herein is implemented as a waveform, in which various properties of the waveform (e.g., duration, amplitude, frequency) are predefined. It will be understood that the amplitude and/or frequency need not be constant within a single pulse. However, it is generally desirable for each haptic pulse to have substantially the same haptic characteristics, enabling a like-to-like comparison between the acceleration profiles observed during different usage states of the stylus.

In some examples, the vibration intensity is beneficially set to a level that is imperceptible, or nearly imperceptible, to a human user while the active stylus is held in the user's hand, so as to avoid becoming distracting. Use of a relatively low intensity haptic pulse provides the additional benefit of reducing energy consumption. However, it will be understood that any suitable intensity may be used, and thus the haptic pulse may be perceptible to the user in some examples.

In some examples, the haptic pulse is one of a plurality of sequentially generated haptic pulses, and each haptic pulse of the sequentially generated plurality of haptic pulses is temporally separated by an inter-pulse time interval. In other words, the controller of the active stylus controls the haptic feedback system to generate a sequence of haptic pulses—e.g., to periodically check whether the usage state of the active stylus has changed.

Figure 4:
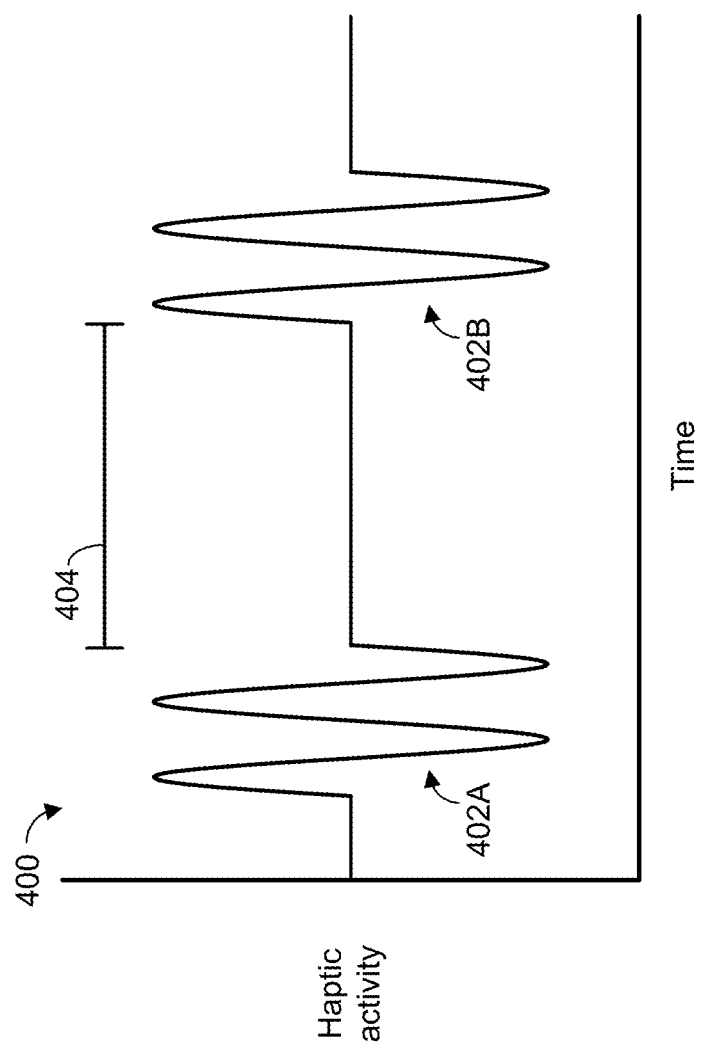
FIG. 4 depicts a simplified example plurality of sequentially generated haptic pulses.

This is schematically illustrated with respect to FIG. 4, showing another example plot 400 of haptic activity over time. As shown, plot 400 includes two discrete haptic pulses 402A and 402B, which are temporally separated by an inter-pulse time interval 404.

The inter-pulse time interval has any suitable length depending on the implementation. Use of a relatively longer inter-pulse time interval serves to preserve battery charge, while reducing the responsiveness of the stylus to changes in usage state. By contrast, use of a relatively shorter inter-pulse time interval can improve the speed at which the active stylus detects a change in usage state, while increasing energy consumption. In some examples, the length of the inter-pulse time interval is variable—e.g., the length may be dynamically increased or decreased depending on the current context. In some examples, the inter-pulse time interval is zero—e.g., the haptic pulse is continuous while the active stylus is powered on.

As one non-limiting example, a length of the inter-pulse time interval may be dynamically changed based at least in part on the current usage state of the stylus—e.g., upon detecting that the stylus is in an inactive state, the inter-pulse time interval may be increased so as to preserve battery life. As another example, a length of the inter-pulse time interval may be dynamically changed based at least in part on a current battery charge level of the active stylus—e.g., as the battery charge level decreases, the length of the inter-pulse time interval is increased to preserve battery charge.

In some cases, the controller causes generation of haptic pulses in response to detection of a pulse triggering condition, in addition to or instead of sequentially generating haptic pulses at regular intervals. In general, detecting the haptic feedback trigger refers to detection of any suitable data indicating that the current usage state of the active stylus may have recently changed, and thus a haptic pulse should be generated to check the current usage state of the stylus. It will be understood that, depending on the specific capabilities of the active stylus and/or host computing device, a wide variety of different types of data could potentially be indicative of a change in usage state of the stylus. Thus, a wide variety of different suitable triggers could cause generation of a haptic pulse.

As one non-limiting example, detecting the pulse triggering condition includes detecting a change in acceleration (e.g., as reported by the accelerometer) that exceeds an acceleration threshold. This can, for example, occur when a user picks up the stylus with the intention of using it. Any suitable acceleration threshold may be used depending on the implementation—e.g., to balance sensitivity to changes in stylus usage state against energy consumption.

Additionally, or alternatively, the pulse triggering condition may be satisfied upon detecting non-repetitive acceleration—e.g., an acceleration spike that is not preceded by a different spike of similar magnitude within a threshold length of time, such as a few seconds. This can, for example, cause triggering of a haptic pulse in cases where the user lifts the stylus from a surface, but not in cases where the stylus is repetitively moving because it is being carried by a walking user.

As another non-limiting example, detecting the pulse triggering condition may include detecting a change in state of a communication signal received from a host computing device. A "change" in signal can refer to the loss of a signal that was previously detected, detection of a new signal, a change in signal strength, and/or specific data encoded by the signal. For instance, loss of a previously detected signal is potentially indicative that the user is carrying the stylus away from the host computing device because they no longer intend to use it. Thus, such a change in signal in some cases triggers the stylus to generate a haptic pulse in order to confirm its current usage state.

In one example scenario, electrostatic communication has an effective range of approximately 5 cm to 100 cm depending on the device type (e.g., small vs large), while Bluetooth communication has a maximum range of approximately 9 m. In a case where a user grip on the stylus is detected, and the stylus is within electrostatic communication range of the computing device, it is likely that the user intends to use the stylus, and therefore the stylus may be switched to an active power state in some examples. By contrast, if the user grip is detected but the stylus is outside of communication range of the computing device (e.g., outside of electrostatic and/or Bluetooth range), then it may be less likely that the user intends to use the stylus, and thus the stylus may remain inactive.

In any case, selectively controlling when haptic pulses are generated through use of a pulse triggering condition as described above provides several technical benefits. For example, electrical power consumption of the active stylus is reduced as the stylus will spend less time unnecessarily occupying the active power state. Similarly, the responsiveness with which the stylus pairs with a computing device and begins sending control inputs is improved, which thereby improves human-computer interaction.

Figure 5:
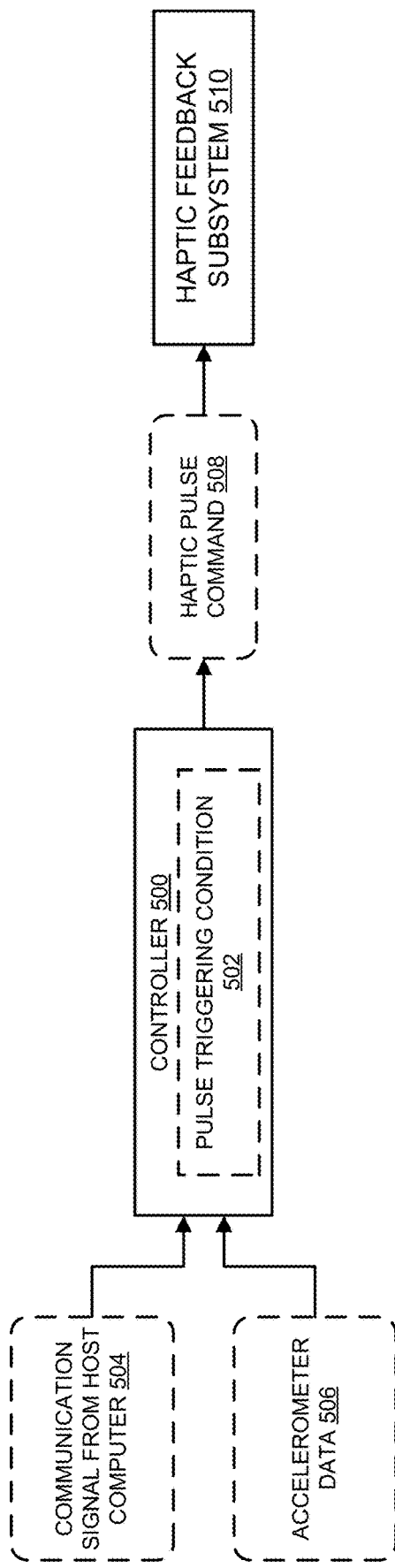
FIG. 5 schematically illustrates triggering of a haptic pulse in response to detection of a pulse triggering condition.

This is schematically illustrated with respect to FIG. 5, showing another example controller 500. Controller 500 is configured to control one or more operations of an active stylus, as described above. As shown in FIG. 5, controller 500 checks for detection of a pulse triggering condition 502. In this example, factors that may contribute to the pulse triggering condition being detected include a communication signal 504 received from a host computing device, and accelerometer data 506 received from an accelerometer of the active stylus. Regardless, upon detecting that the pulse triggering condition is met, the controller transmits a haptic pulse command 508 to the haptic feedback subsystem 510, which then generates the haptic pulse.

The haptic pulse command takes any suitable form. In some examples, the controller directly drives a haptic feedback motor, and thus the haptic pulse command takes the form of a variable electrical voltage supplied to the haptic feedback motor to cause oscillation. In other examples, the haptic pulse command takes the form of digital data transmitted to a separate logic component of the active stylus (e.g., a haptic subsystem controller) that directly controls the haptic motor to generate the haptic pulse.

Figure 2:
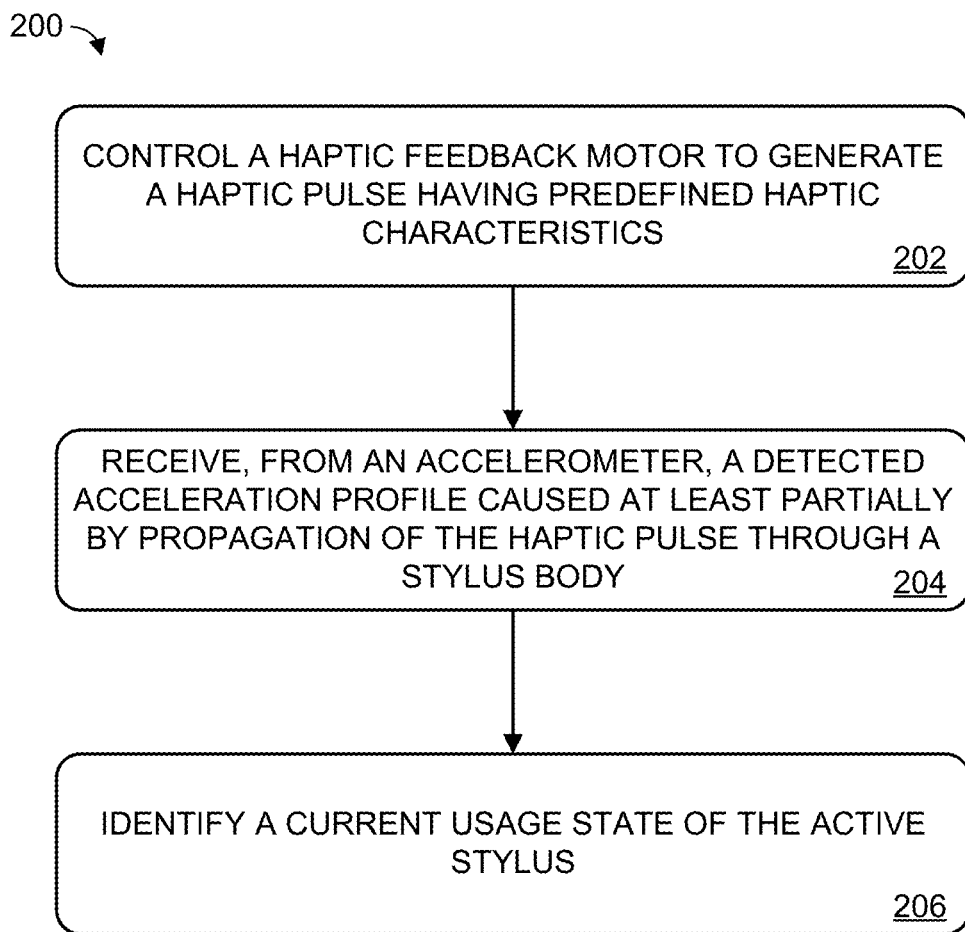
FIG. 2 illustrates an example method for active stylus usage state identification.

Returning briefly to FIG. 2, method 200 includes, at 204, receiving a detected acceleration profile from an accelerometer of the active stylus. Specifically, the detected acceleration profile is caused at least partially by propagation of the haptic pulse through a stylus body of the active stylus, and caused at least partially by attenuation of the haptic pulse by an external object contacting the stylus body.

Figure 3C:
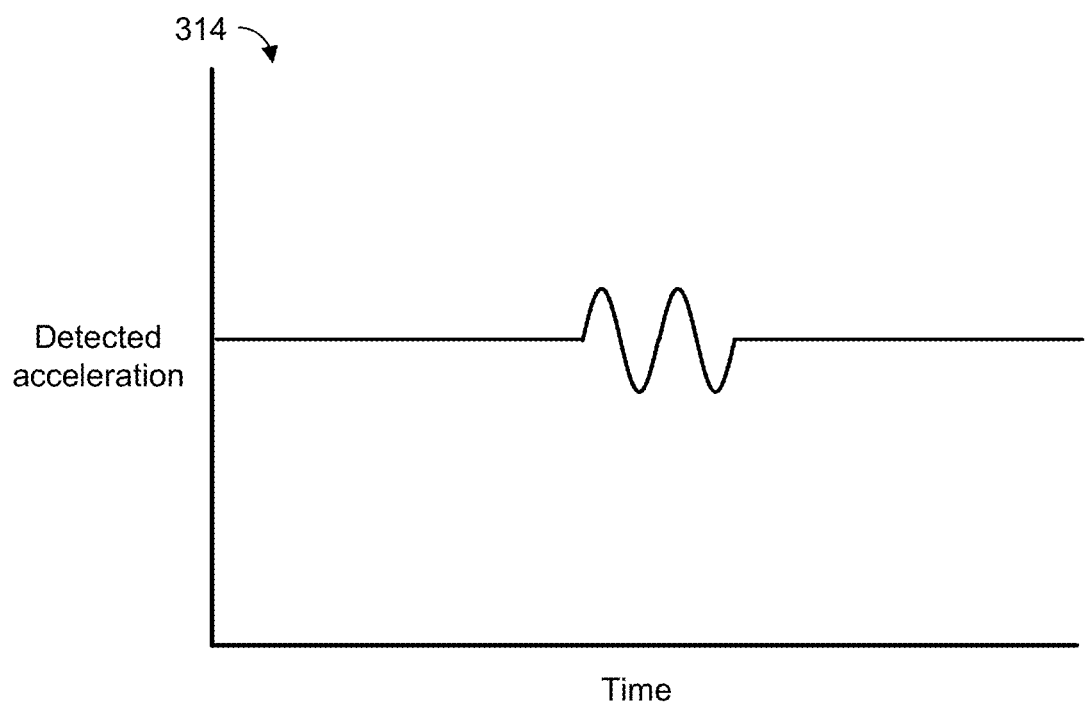

This is schematically illustrated with respect to FIG. 3C, which provides a highly simplified representation of a detected acceleration profile 314. Specifically, FIG. 3C shows a representation of data collected by accelerometer 304 of active stylus 300 when haptic feedback subsystem 302 is controlled to generate the haptic pulse. As discussed above, while the haptic pulse generated by the haptic feedback subsystem influences the acceleration profile, the haptic pulse is also subject to some amount of attenuation—e.g., due to rigidity of the stylus body, and due to contact between the stylus body and an external object. Thus, as shown, the detected acceleration profile has a smaller amplitude than the initial haptic pulse shown in FIG. 3B.

In the example of FIG. 3C, substantially all of the acceleration data detected by the accelerometer is attributable to the haptic pulse provided by the haptic feedback system. However, it will be understood that this need not be the case. Rather, in some examples, the acceleration profile is additionally representative of acceleration of the active stylus caused by an external factor other than the haptic pulse—e.g., because a user is moving the stylus (such as by picking it up, placing it, or carrying it), because the stylus has been dropped or thrown, or because some other force has caused acceleration of the stylus (e.g., vibration from a moving vehicle). As will be described in more detail below, such acceleration data can in some cases be useable to infer the current usage state of the stylus—e.g., the acceleration data may be indicative of a scenario where a user has picked up the stylus intending to use it.

Figure 6:
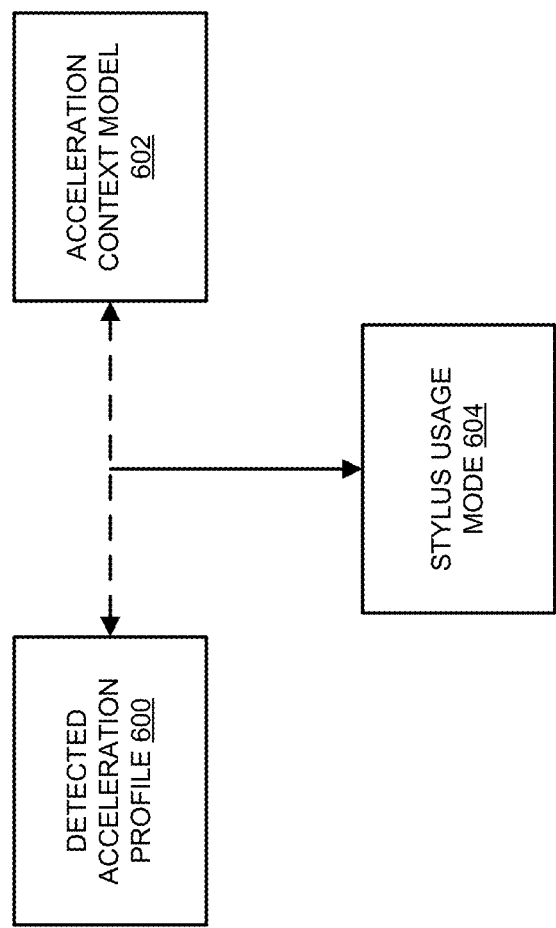
FIG. 6 schematically illustrates identifying a current usage state of an active stylus by comparing a detected acceleration profile to an acceleration context model.

Returning briefly to FIG. 2, at 206, method 200 includes identifying a current usage mode of the active stylus based at least in part on a comparison between the detected acceleration profile and an acceleration context model. This is schematically illustrated with respect to FIG. 6, in which a detected acceleration profile 600 is compared to an acceleration context model 602 to identify a current usage mode 604 of the active stylus. As described above, this can be used to beneficially improve the power efficiency and/or responsiveness of the active stylus, as power-consuming functions of the stylus can be selectively enabled or disabled depending on the current usage mode of the stylus.

In general, the "acceleration context model" takes the form of any suitable data structure or algorithm developed based on accelerometer signals observed while the same active stylus, or similar active styluses, had different usage states. For example, testing and/or historical data can be used to determine how the acceleration profile detected by the stylus's accelerometer is affected by different environmental contexts while the haptic feedback subsystem is controlled to provide haptic pulses. Such environmental contexts can include, as examples, the stylus resting on a surface (e.g., hard or soft surface); the stylus being held by a human hand; the stylus being gripped by a user with greater or lesser amounts of grip strength; the stylus being carried by a user while walking; the stylus being held in a pocket, bag, carrying case, and/or other container; the stylus being coupled with a charging device (e.g., connected to a charging cable, or magnetically held against a charging surface); and/or the stylus being actively used to provide touch input to a touch-sensitive display.

Each of these environmental contexts may affect the acceleration profile detected by the accelerometer in different characteristic ways—e.g., depending on the material properties of the external object that the stylus is contacting, depending on the amount of surface area of the stylus contacting the external object, and depending on the pressure that the external object is exerting on the stylus. These factors can in some cases affect the degree to which the haptic pulse is attenuated before it is detected by the accelerometer. Furthermore, during testing and/or historical data collection, each of these environmental contexts may be labelled with an indication of whether that context corresponds to active use of the stylus. Thus, in some examples, comparing the observed acceleration profile to the acceleration context model includes determining an observed amount of attenuation as compared to the initial known pulse intensity, and then identifying a recorded environmental context associated with a similar degree of attenuation. Then, the current usage state of the stylus is in some cases identified based on whether that environment context is associated with active use of the stylus.

In one non-limiting example, a context in which the stylus is resting on a surface is associated with an attenuation factor of 1, and a different context in which the stylus is being held in a human hand with a relatively loose grip is associated with an attenuation factor of 0.8. In other words, the intensity of the initial haptic pulse is attenuated by approximately 20% when held loosely, as compared to the case where the stylus is resting on a surface. Similarly, in one example, a context in which the stylus is held with an average grip is associated with an attenuation factor of 0.7, and a relatively strong grip is associated with an attenuation factor of 0.5.

Thus, for instance, upon determining that a particular acceleration profile is indicative of approximately 50% attenuation of the initial haptic pulse as compared to the stylus resting on a surface, the controller may classify the current state of the stylus as being held by a human user with a strong grip, which corresponds to an active usage state. In other words, in some examples, the current usage state is identified as an active use state based at least in part on determining, from the comparison between the detected acceleration profile and the acceleration context model, that the detected acceleration profile is consistent with contact between the stylus body and a human hand that causes the attenuation of the haptic pulse.

Similarly, the position at which the hand is gripping the stylus can affect haptic attenuation. In one non-limiting example, when the stylus is gripped near the tip or middle of the stylus body, the attenuation factor is 0.7, while a grip near the tail end of the stylus is associated with an attenuation factor of 0.9. In some examples, specific grip positions on the stylus body may be associated with active use, while other grip positions are not associated with active use—e.g., a grip near the middle or tip of the stylus may be associated with a "pencil" grip used for providing touch input, while a grip near the tail of the stylus may be more indicative of a user temporarily moving the stylus to place it in a bag. In other words, in some examples, the active use state is further defined by a specific grip position of the human hand relative to the stylus body, as inferred from the comparison between the detected acceleration profile and the acceleration context model. This beneficially enables control over power consuming functions of the stylus depending on the specific grip position used by a user while holding the stylus—e.g., in some examples, the stylus only enters the active power state if a specific grip position associated with active use (such as a "writing" grip) is detected, thereby conserving electrical power.

Additionally, or alternatively, detection of the relative grip pressure applied to the stylus body can be used to control functions of the host computing device and/or active stylus. As described above, variable amounts of grip pressure on the stylus body are in some cases detectable as variable levels of attenuation applied to the haptic pulse as detected by the accelerometer. Thus, in some examples, the stylus controller is configured to estimate a grip pressure of the human hand from the comparison between the detected acceleration profile and the acceleration context model (e.g., by comparing relative attenuation levels). Upon detecting that the grip pressure exceeds a grip threshold, the stylus controller may, for example, transmit a control input to a host computing device. In this manner, the user can use their grip pressure to control the computing device—e.g., by increasing their grip strength, the user can change a line weight of a line that they are drawing on a touch-sensitive display. This beneficially improves human-computer interaction by providing new a new method by which the user is able to transmit input to, and thereby control, a computing device. It will be understood that any arbitrary grip threshold may be used depending on the implementation.

By contrast, relatively less attenuation of the haptic pulse may be indicative of an inactive use mode, in which the user is not currently intending to use the stylus with a host computing device. For example, a context in which the stylus is resting on a hard surface may be associated with relatively little attenuation of the haptic pulse. In other words, the current usage state of the active stylus may in some cases be identified as an inactive state based at least in part on determining, from the comparison between the detected acceleration profile and the acceleration context model, that the detected acceleration profile is consistent with the active stylus resting on a surface that causes the attenuation of the haptic pulse.

Conversely, relatively higher degrees of attenuation can also be indicative of an inactive mode. For example, when the stylus is carried in a container (such as a pocket, bag, or protective case), the amount of contact between the active stylus and external object, and/or the amount of pressure applied by the external object, may cause relatively more attenuation of the active stylus, where the specific amount of attenuation varies depending on the specific circumstances. In other words, in some examples, the current usage state of the stylus is identified as an inactive state based at least in part on determining, from the comparison between the detected profile and the predefined acceleration context model, that the detected acceleration profile is consistent with the active stylus being held in a container that causes the attenuation of the haptic pulse.

As indicated above, the acceleration context model takes any suitable form, is generated at any suitable time, and by any suitable entity. As one non-limiting example, the acceleration context model may be implemented as a table (e.g., look-up table) or other similar data structure that relates different properties of the detected acceleration pulse (e.g., attenuation values) to different usage states. In this manner, upon determining a particular attenuation value, the acceleration context model can be referenced to determine the usage state that the attenuation value corresponds to.

As another example, the acceleration context model may be generated and implemented using suitable machine learning (ML) and/or artificial intelligence (AI) techniques—e.g., the acceleration context model may be implemented as a machine learning-trained classifier. Examples of suitable ML and/or AI technologies and training methods will be described below with respect to FIG. 10. In general, this may include receiving examples of prior detected acceleration profiles, as well as indications (e.g., labels, annotations) of the usage states that such acceleration profiles correspond to.

In this manner, the model may be trained to classify future detected acceleration profiles as corresponding to different usage states.

In any case, it will be understood that an acceleration context model may include any variety of data in addition to, or as an alternative to, attenuation factors corresponding to different environmental contexts. For example, as described above, the acceleration profile may in some cases be indicative of acceleration of the stylus caused by external factors other than a haptic pulse generated by a haptic feedback subsystem. Some such acceleration factors are indicative of active use of the stylus, while other such acceleration factors are indicative that the stylus is inactive. For example, consistent acceleration spikes of similar magnitude may be consistent with a user walking while carrying the stylus, which may be an indicator that the user is not actively using the stylus to control a computing device. By contrast, a single acceleration spike may be an indicator that the user has picked up the stylus intending to use it. Thus, in some examples, comparing the detected acceleration profile to the acceleration context model may include comparing various properties of the peaks and valleys in the acceleration profile waveform—e.g., the consistency, magnitude, and spacing of waveform peaks—to prior documented acceleration profiles corresponding to different environmental contexts.

Figure 7A:
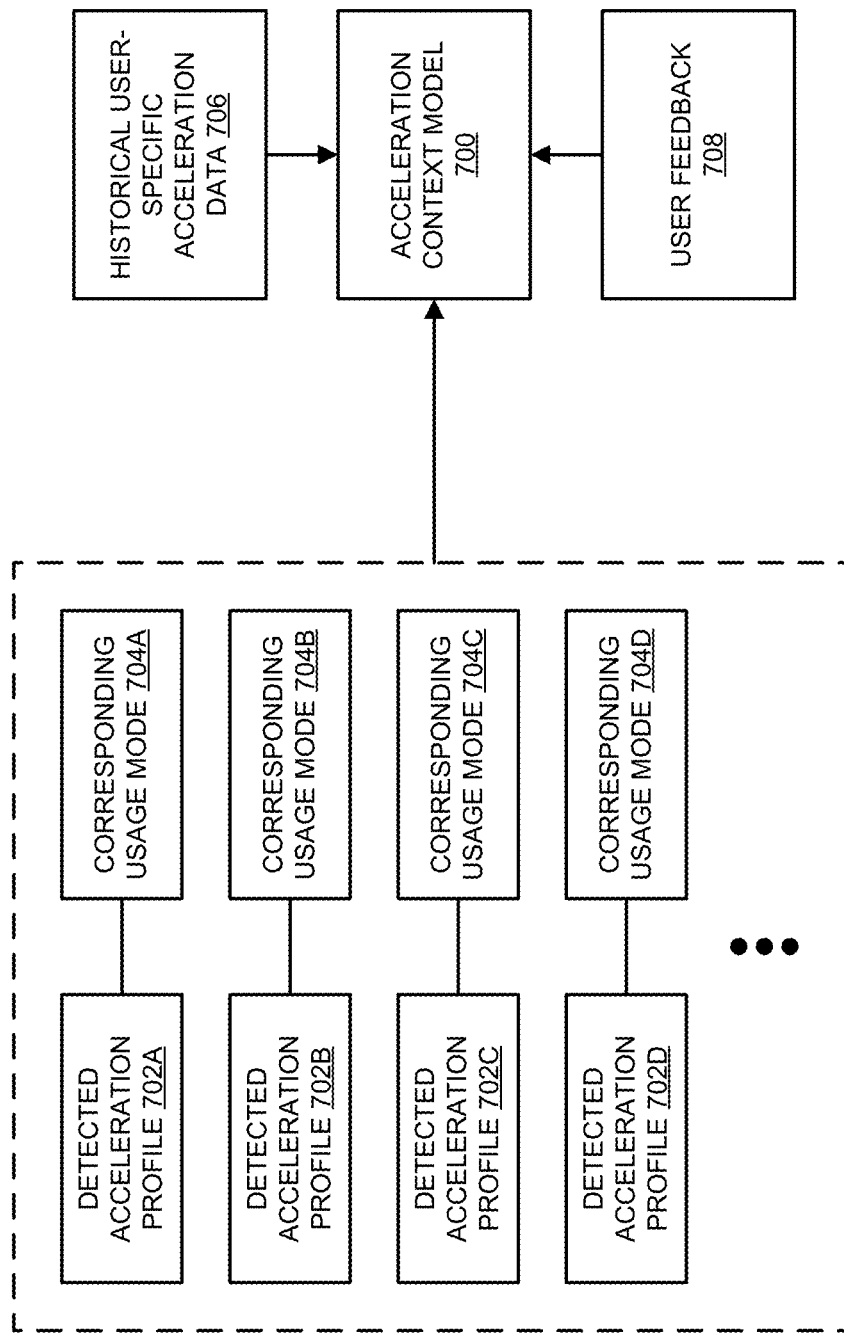
FIGS. 7A and 7B schematically illustrate generation of an acceleration context model.

FIG. 7A schematically illustrates generation of an acceleration context model 700. In this example, the acceleration context model is generated based at least in part on a plurality of prior detected acceleration profiles 702A-702D, corresponding to different environmental contexts, which are each associated with a corresponding stylus usage mode 704A-704D. In this manner, the acceleration context model may, for instance, maintain a mapping of different attenuation factors to different environmental contexts, and therefore different usage modes.

The prior detected acceleration profiles may be obtained at any suitable time and by any suitable party. As one example, the acceleration context model is partially or entirely generated by the manufacturer of the active stylus—e.g., by testing how a particular model of stylus behaves under different environmental conditions, and then pre-loading an acceleration context model onto the stylus prior to sale, and/or by providing an acceleration context model for installation by a user. Examples of different acceleration profiles will be provided below with respect to FIGS. 9A-9G.

As another example, the acceleration context model may be at least partially generated after the stylus is acquired by an end user. In other words, in some examples, the stylus controller is further configured to store historical acceleration data over time during use of the active stylus by a user, and derive the acceleration context model based at least in part on the historical acceleration data.

For example, in FIG. 7A, the acceleration context model is further generated based at least in part on historical user-specific acceleration data 706 collected during use of the active stylus by a user. This can include, for instance, detecting a particular acceleration profile and then inferring, based on subsequent acceleration data and/or an external indicator, whether the stylus was actually used or not. As one example, a temporary increase in haptic attenuation, followed by a subsequent decrease, may be an indicator that the stylus was not actually used, but was simply moved from one place to another by a user. By contrast, an increase in attenuation followed by a successful pairing with a computing device may be an indicator that the detected acceleration profile is associated with active use.

In some cases, the acceleration context model may be derived and/or modified by the stylus controller based at least in part on user feedback relating to an accuracy of a previous usage state identification for a previous detected acceleration profile. In one example scenario, the user may provide input to the stylus (e.g., by pressing a button or changing their grip strength), and/or by interacting with a companion software application on a host computing device, to indicate whether they are actively using the stylus or not when prompted. This can serve as a calibration routine, in which the haptic feedback subsystem is controlled at various times to generate haptic pulses, and the user can confirm whether or not they are currently using the stylus. In the example of FIG. 7A, the acceleration context model is generated based at least in part on user feedback 708.

Figure 7B:
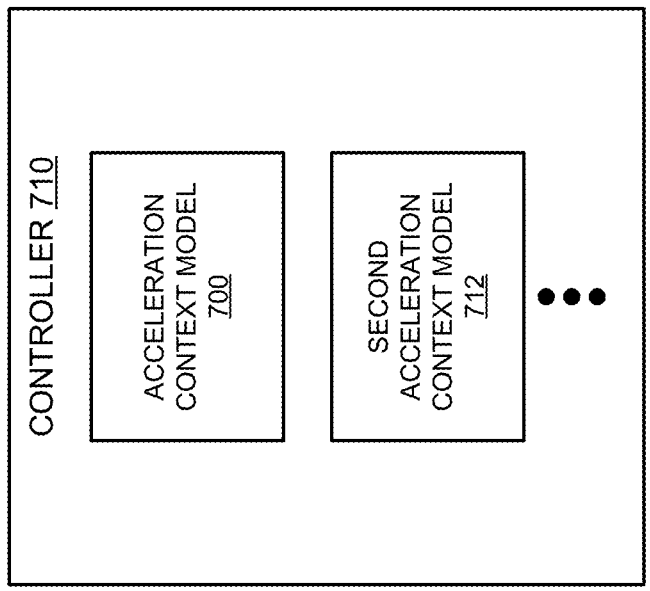

In cases where the acceleration context model is generated at least partially after the stylus is acquired by an end user, then the acceleration context model may be representative of that particular user's usage habits. Thus, in some examples, the stylus controller may maintain one or more additional acceleration context models that are independently generated for one or more additional users. This is schematically illustrated with respect to FIG. 7B, schematically showing an example controller 710. As shown, controller 710 maintains acceleration context model 700 of FIG. 7A that is specific to a first user, and further maintains a second acceleration context model 712 that is specific to a second user. Use of such user-specific profiles beneficially improves human-computer interaction, tailoring the specific power-consumption behavior of a stylus to the identity of a specific user currently holding the stylus.

In any case, as discussed above, a detected acceleration profile is compared to an acceleration context model to identify a current usage state of the active stylus. From there, in some examples, various functions of the stylus can be activated, deactivated, and/or otherwise changed depending on the current usage state—e.g., to conserve electrical power. For instance, in some examples, the stylus controller is configured to, upon identifying the current usage state as an inactive state, disable one or more power-consuming functions of the active stylus—e.g., data transmission, haptic feedback, or built-in audio or light-emitting hardware.

By contrast, upon detecting that the current usage state is the active use state, various functions of the active stylus may be activated—e.g., the controller may initiate electrostatic data transmission with the host computing device to beneficially pair with the host computing device, and apply a user's desired settings, with little to no perceived latency. As another example, upon detecting that the current usage model is the active use state, the stylus controller may transmit an application launch command to the host computing device, causing the host computing device to begin execution of a corresponding software application. This may, for instance, beneficially reduce the burden of user input to the computing device by rapidly launching a preferred software application (e.g., notetaking application) when it is apparent that the user intends to use the active stylus.

Figure 8:
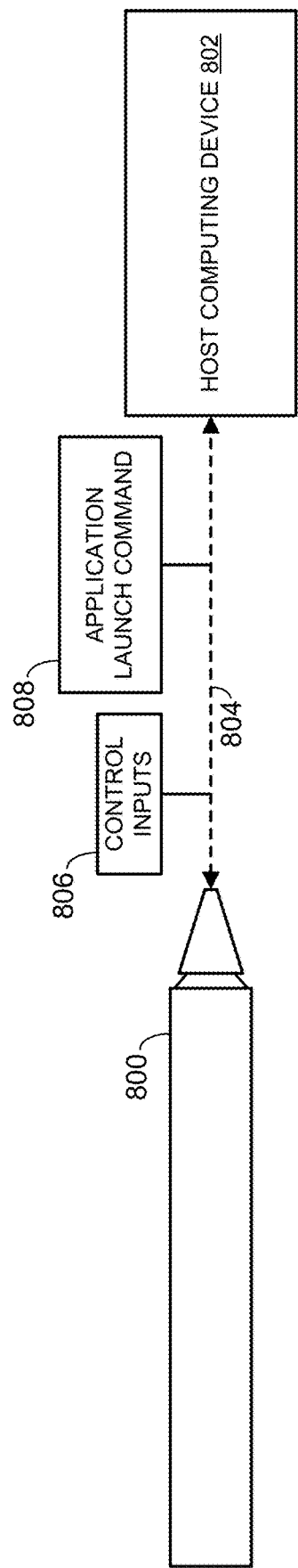
FIG. 8 schematically depicts transmission of data by an active stylus to a host computing device.

Such interaction between the active stylus and the host computing device is schematically illustrated with respect to FIG. 8. Specifically, FIG. 8 shows another example stylus 800 being used with a host computing device 802. A controller of the active stylus has determined that the stylus is in an active use state, as described above. As such, the stylus has initiated electrostatic transmission 804 with the host computing device. This may include transmitting control inputs 806, and/or an application launch command 808, as described above.

FIGS. 9A-9G illustrate example acceleration profiles consistent with different usage states and environmental contexts for an active stylus. These profiles may, for instance, be useable to generate an acceleration context model as described above. It will be understood that the profiles illustrated with respect to FIGS. 9A-9G are non-limiting examples and are provided only for the sake of illustration.

Figure 9A:
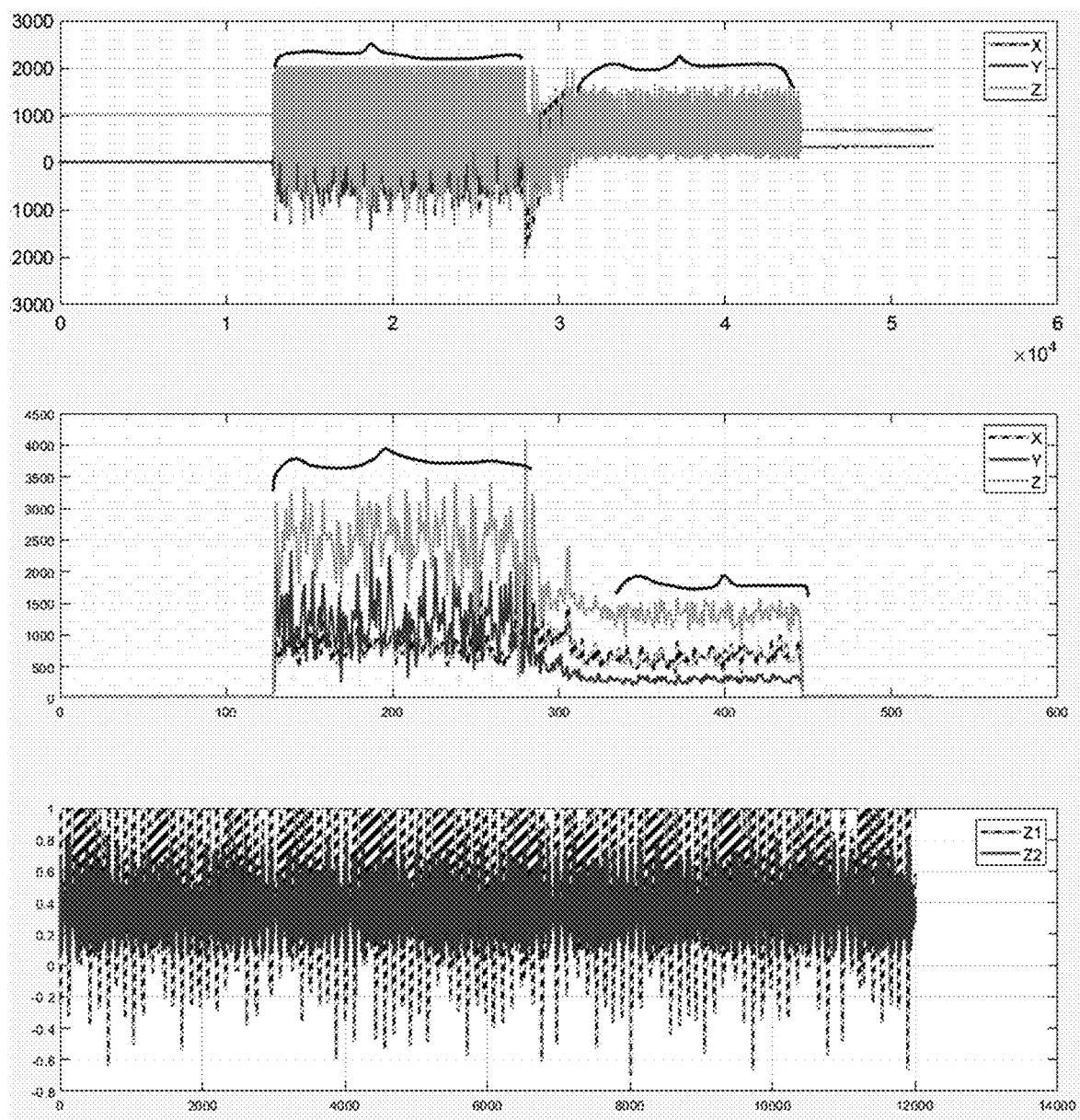
FIGS. 9A-9G show example acceleration profiles consistent with different usage states of an active stylus.
Figure 9B:
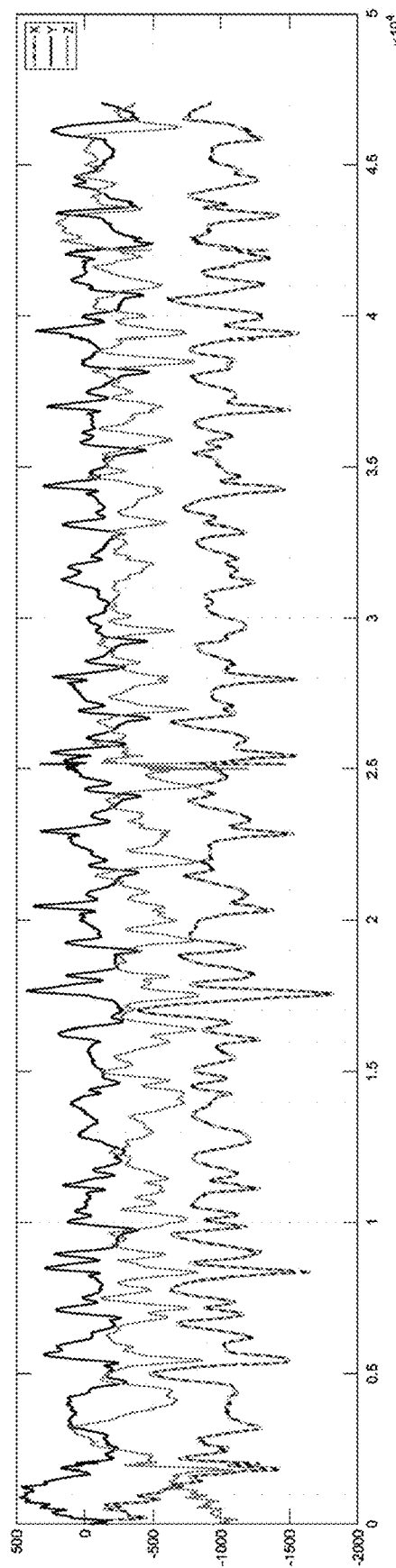
Figure 9C:
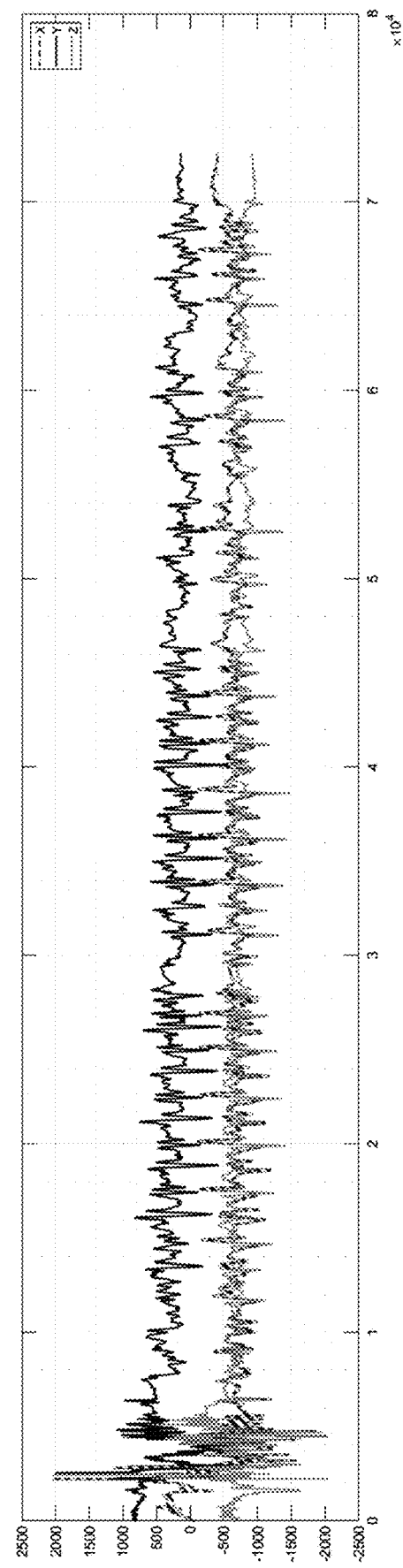
Figure 9D:
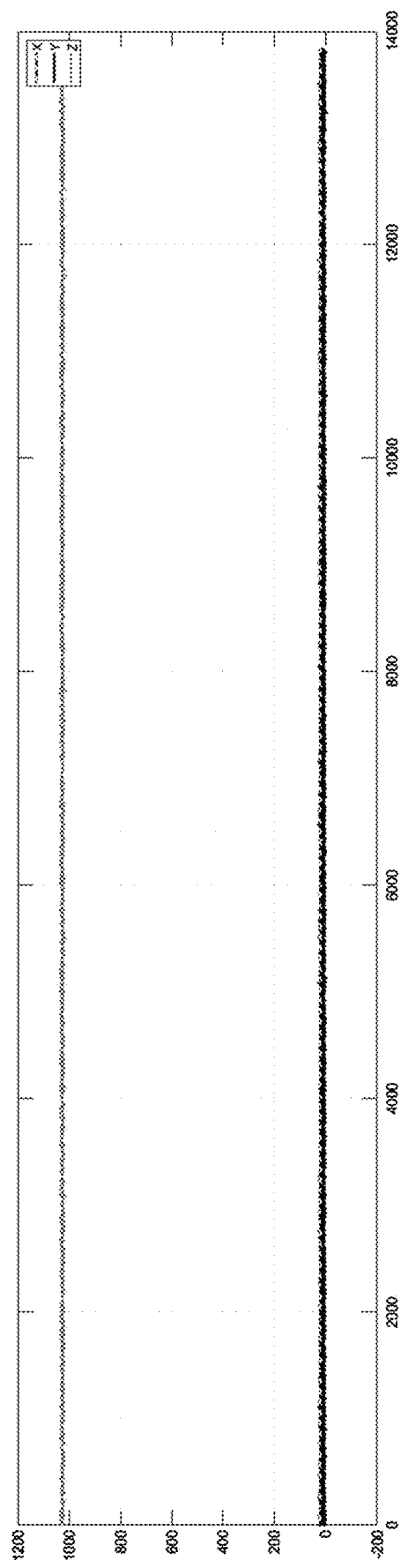
Figure 9E:
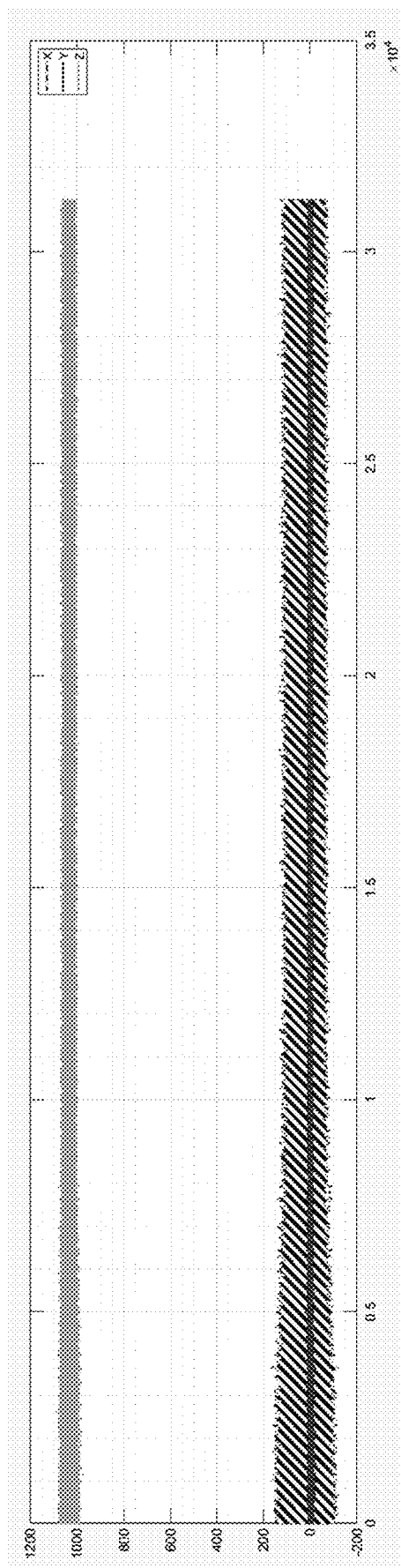
Figure 9F:
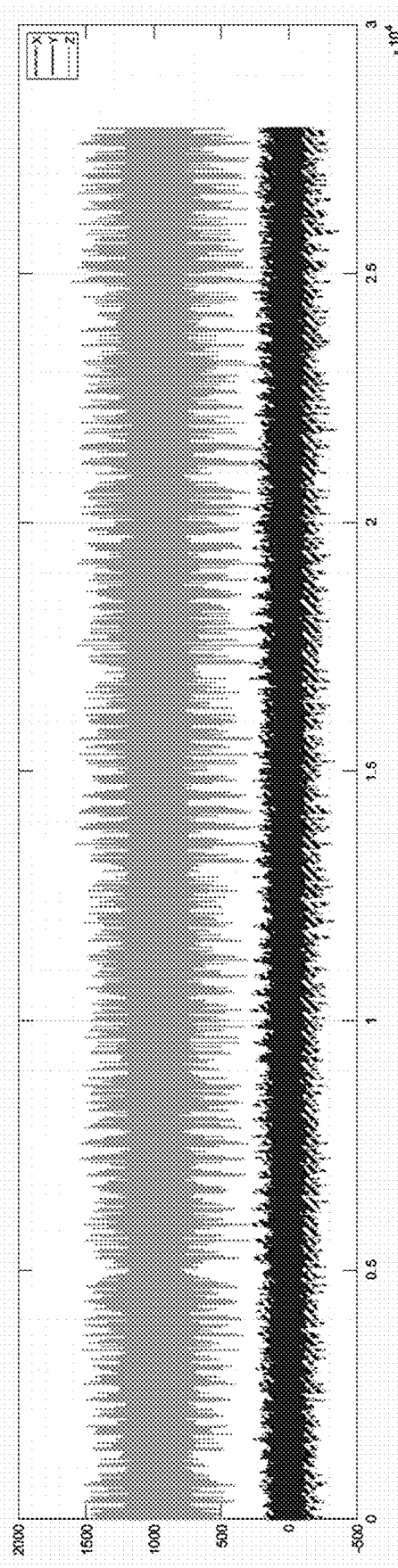
Figure 9G:
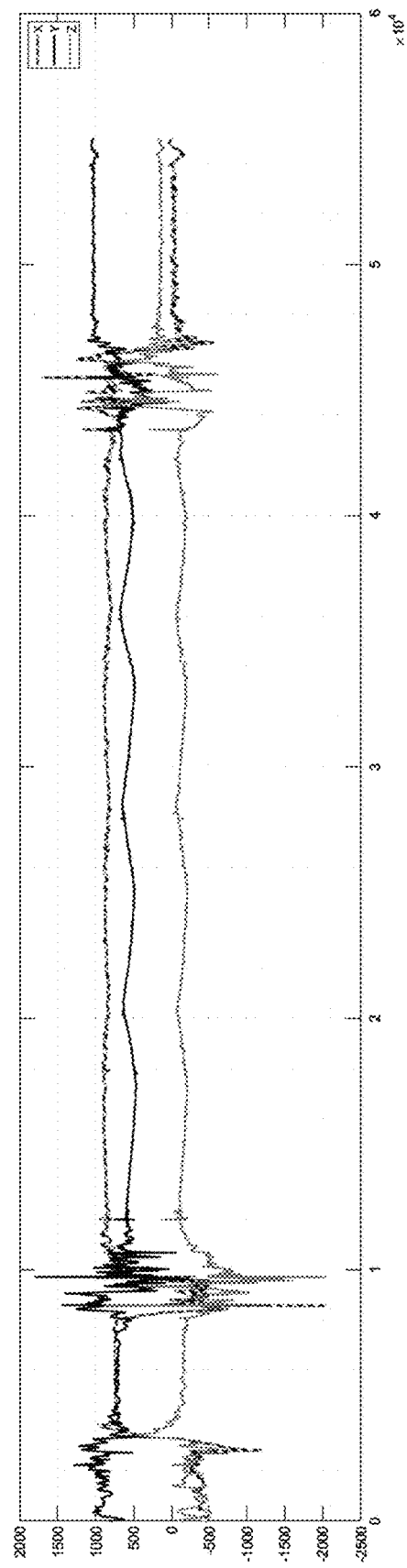

Specifically, FIG. 9A shows example acceleration profiles consistent with a stylus that is initially resting on a table surface, and is then lifted by a user. FIG. 9B shows an example acceleration profile consistent with a stylus being carried in a user's hand while walking. FIG. 9C shows an example acceleration profile consistent with a stylus carried in a user's pocket while walking. FIG. 9D shows an example acceleration profile consistent with a stylus resting on a table surface with no ongoing haptic pulses. FIG. 9E shows an example acceleration profile consistent with a stylus resting on a table surface while a haptic pulse is continuously provided. FIG. 9F shows an example acceleration profile consistent with a stylus that is magnetically affixed to a host computing device (e.g., for storage and/or charging) while a continuous haptic pulse is provided. FIG. 9G shows an example acceleration profile in which a stylus is held by a user hand and used to provide input to a host computing device.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 10:
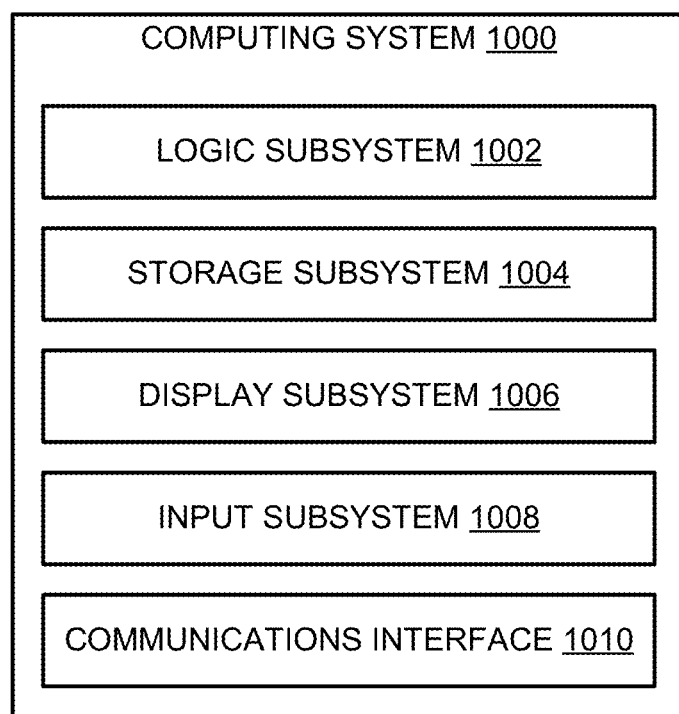
FIG. 10 schematically shows an example computing system.

FIG. 10 schematically shows a simplified representation of a computing system 1000 configured to provide any to all of the compute functionality described herein. Computing system 1000 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 1000 includes a logic subsystem 1002 and a storage subsystem 1004. Computing system 1000 may optionally include a display subsystem 1006, input subsystem 1008, communication subsystem 1010, and/or other subsystems not shown in FIG. 10.

Logic subsystem 1002 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1004 includes one or more physical devices configured to temporarily and/or permanently hold computer information such as data and instructions executable by the logic subsystem. When the storage subsystem includes two or more devices, the devices may be collocated and/or remotely located. Storage subsystem 1004 may include volatile, nonvolatile, dynamic, static, read/write, read-only, random-access, sequential-access, location-addressable, file-addressable, and/or content-addressable devices. Storage subsystem 1004 may include removable and/or built-in devices. When the logic subsystem executes instructions, the state of storage subsystem 1004 may be transformed—e.g., to hold different data.

Aspects of logic subsystem 1002 and storage subsystem 1004 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 1006 may be used to present a visual representation of data held by storage subsystem 1004. This visual representation may take the form of a graphical user interface (GUI). Display subsystem 1006 may include one or more display devices utilizing virtually any type of technology. In some implementations, display subsystem may include one or more virtual-, augmented-, or mixed reality displays.

When included, input subsystem 1008 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1010 may be configured to communicatively couple computing system 1000 with one or more other computing devices. Communication subsystem 1010 may include wired and/or wireless communication devices compatible with one or more different communication protocols. The communication subsystem may be configured for communication via personal-, local- and/or wide-area networks.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data may only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible, anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components may be trained on diverse, representative datasets that include sufficient relevant data for diverse users and/or populations of users. In particular, training data sets may be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, an active stylus comprises: a haptic feedback subsystem; an accelerometer; and a controller to: control the haptic feedback subsystem to generate a haptic pulse having predefined haptic characteristics; receive, from the accelerometer, a detected acceleration profile caused at least partially by propagation of the haptic pulse through a stylus body of the active stylus, and caused at least partially by attenuation of the haptic pulse by an external object contacting the stylus body; and identify a current usage state of the active stylus based at least in part on a comparison between the detected acceleration profile and an acceleration context model. In this example or any other example, the haptic pulse is one of a plurality of sequentially generated haptic pulses, and wherein each haptic pulse of the plurality of sequentially generated haptic pulses is temporally separated by an inter-pulse time interval. In this example or any other example, a length of the inter-pulse time interval is dynamically changed based at least in part on the current usage state of the active stylus. In this example or any other example, a length of the inter-pulse time interval is dynamically changed based at least in part on a current battery charge level of the active stylus. In this example or any other example, the controller causes generation of the haptic pulse in response to detection of a pulse triggering condition. In this example or any other example, detecting the pulse triggering condition includes detecting a change in acceleration that exceeds an acceleration threshold. In this example or any other example, detecting the pulse triggering condition includes detecting a change in state of a communication signal received from a host computing device. In this example or any other example, the current usage state is identified as an active use mode based at least in part on determining, from the comparison between the detected acceleration profile and the acceleration context model, that the detected acceleration profile is consistent with contact between the stylus body and a human hand that causes the attenuation of the haptic pulse. In this example or any other example, the active use mode is further defined by a specific grip position of the human hand relative to the stylus body, as inferred from the comparison between the detected acceleration profile and the acceleration context model. In this example or any other example, the controller is further configured to estimate a grip pressure of the human hand from the comparison between the detected acceleration profile and the acceleration context model, and upon detecting that the grip pressure exceeds a grip threshold, transmit a control input to a host computing device. In this example or any other example, the controller is further configured to, upon detecting that the current usage state is the active use mode, initiate electrostatic data transmission to a host computing device. In this example or any other example, the controller is further configured to, upon detecting that the current usage state is the active use mode, transmit an application launch command to a host computing device, causing the host computing device to begin execution of a corresponding software application. In this example or any other example, the controller is further configured to, upon identifying the current usage state as an inactive mode, disable one or more power-consuming functions of the active stylus. In this example or any other example, the current usage state of the active stylus is identified as an inactive mode based at least in part on determining, from the comparison between the detected acceleration profile and the acceleration context model, that the detected acceleration profile is consistent with the active stylus resting on a surface that causes the attenuation of the haptic pulse. In this example or any other example, the current usage state of the active stylus is identified as an inactive mode based at least in part on determining, from the comparison between the detected acceleration profile and the acceleration context model, that the detected acceleration profile is consistent with the active stylus being held in a container that causes the attenuation of the haptic pulse. In this example or any other example, the controller is further configured to store historical acceleration data over time during use of the active stylus by a first user, and derive the acceleration context model based at least in part on the historical acceleration data. In this example or any other example, the acceleration context model is specific to the first user, and wherein the controller further maintains a second acceleration context model that is specific to a second user. In this example or any other example, the controller is further configured to modify the acceleration context model based at least in part on feedback relating to an accuracy of a previous usage state identification for a previous detected acceleration profile.

In an example, a method for active stylus usage state identification comprises: controlling a haptic feedback subsystem of an active stylus to generate a haptic pulse having predefined haptic characteristics; receiving, from an accelerometer of the active stylus, a detected acceleration profile caused at least partially by propagation of the haptic pulse through a stylus body of the active stylus, and caused at least partially by attenuation of the haptic pulse by an external object contacting the stylus body; and identifying a current usage state of the active stylus based at least in part on a comparison between the detected acceleration profile and an acceleration context model.

In an example, an active stylus comprises: a haptic feedback subsystem; an accelerometer; and a controller configured to: control the haptic feedback subsystem to generate a haptic pulse having predefined haptic characteristics; receive, from the accelerometer, a detected acceleration profile caused at least partially by propagation of the haptic pulse through a stylus body of the active stylus, and caused at least partially by attenuation of the haptic pulse by a human hand gripping the stylus body; identify a current usage state of the active stylus as an active use mode after determining, from a comparison between the detected acceleration profile and an acceleration context model, that the detected acceleration profile is consistent with contact between the stylus body and the human hand; and upon detecting that the current usage state is the active use mode, transmit an application launch command to a host computing device, causing the host computing device to begin execution of a corresponding software application.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An active stylus, comprising:
a haptic feedback subsystem;
an accelerometer; and
a controller to:
control the haptic feedback subsystem to generate a haptic pulse having predefined haptic characteristics;
receive, from the accelerometer, a detected acceleration profile caused at least partially by propagation of the haptic pulse through a stylus body of the active stylus, and caused at least partially by attenuation of the haptic pulse by an external object contacting the stylus body; and
identify a current usage state of the active stylus based at least in part on a comparison between the detected acceleration profile and an acceleration context model.

2. The active stylus of claim 1, wherein the haptic pulse is one of a plurality of sequentially generated haptic pulses, and wherein each haptic pulse of the plurality of sequentially generated haptic pulses is temporally separated by an inter-pulse time interval.

3. The active stylus of claim 2, wherein a length of the inter-pulse time interval is dynamically changed based at least in part on the current usage state of the active stylus.

4. The active stylus of claim 2, wherein a length of the inter-pulse time interval is dynamically changed based at least in part on a current battery charge level of the active stylus.

5. The active stylus of claim 1, wherein the controller causes generation of the haptic pulse in response to detection of a pulse triggering condition.

6. The active stylus of claim 5, wherein detecting the pulse triggering condition includes detecting a change in acceleration that exceeds an acceleration threshold.

7. The active stylus of claim 5, wherein detecting the pulse triggering condition includes detecting a change in state of a communication signal received from a host computing device.

8. The active stylus of claim 1, wherein the current usage state is identified as an active use mode based at least in part on determining, from the comparison between the detected acceleration profile and the acceleration context model, that the detected acceleration profile is consistent with contact between the stylus body and a human hand that causes the attenuation of the haptic pulse.

9. The active stylus of claim 8, wherein the active use mode is further defined by a specific grip position of the human hand relative to the stylus body, as inferred from the comparison between the detected acceleration profile and the acceleration context model.

10. The active stylus of claim 8, wherein the controller is further configured to estimate a grip pressure of the human hand from the comparison between the detected acceleration profile and the acceleration context model, and upon detecting that the grip pressure exceeds a grip threshold, transmit a control input to a host computing device.

11. The active stylus of claim 8, wherein the controller is further configured to, upon detecting that the current usage state is the active use mode, initiate electrostatic data transmission to a host computing device.

12. The active stylus of claim 8, wherein the controller is further configured to, upon detecting that the current usage state is the active use mode, transmit an application launch command to a host computing device, causing the host computing device to begin execution of a corresponding software application.

13. The active stylus of claim 1, wherein the controller is further configured to, upon identifying the current usage state as an inactive mode, disable one or more power-consuming functions of the active stylus.

14. The active stylus of claim 1, wherein the current usage state of the active stylus is identified as an inactive mode based at least in part on determining, from the comparison between the detected acceleration profile and the acceleration context model, that the detected acceleration profile is consistent with the active stylus resting on a surface that causes the attenuation of the haptic pulse.

15. The active stylus of claim 1, wherein the current usage state of the active stylus is identified as an inactive mode based at least in part on determining, from the comparison between the detected acceleration profile and the acceleration context model, that the detected acceleration profile is consistent with the active stylus being held in a container that causes the attenuation of the haptic pulse.

16. The active stylus of claim 1, wherein the controller is further configured to store historical acceleration data over time during use of the active stylus by a first user, and derive the acceleration context model based at least in part on the historical acceleration data.

17. The active stylus of claim 16, wherein the acceleration context model is specific to the first user, and wherein the controller further maintains a second acceleration context model that is specific to a second user.

18. The active stylus of claim 16, wherein the controller is further configured to modify the acceleration context model based at least in part on feedback relating to an accuracy of a previous usage state identification for a previous detected acceleration profile.

19. A method for active stylus usage state identification, the method comprising:
controlling a haptic feedback subsystem of an active stylus to generate a haptic pulse having predefined haptic characteristics;
receiving, from an accelerometer of the active stylus, a detected acceleration profile caused at least partially by propagation of the haptic pulse through a stylus body of the active stylus, and caused at least partially by attenuation of the haptic pulse by an external object contacting the stylus body; and
identifying a current usage state of the active stylus based at least in part on a comparison between the detected acceleration profile and an acceleration context model.

20. An active stylus, comprising:
a haptic feedback subsystem;
an accelerometer; and
a controller configured to:
control the haptic feedback subsystem to generate a haptic pulse having predefined haptic characteristics;
receive, from the accelerometer, a detected acceleration profile caused at least partially by propagation of the haptic pulse through a stylus body of the active stylus, and caused at least partially by attenuation of the haptic pulse by a human hand gripping the stylus body;

identify a current usage state of the active stylus as an active use mode after determining, from a comparison between the detected acceleration profile and an acceleration context model, that the detected acceleration profile is consistent with contact between the stylus body and the human hand; and upon detecting that the current usage state is the active use mode, transmit an application launch command to a host computing device, causing the host computing device to begin execution of a corresponding software application.

\* \* \* \* \*